(12) United States Patent
Liao et al.

(10) Patent No.: US 8,061,608 B2
(45) Date of Patent: Nov. 22, 2011

(54) CARD READER

(75) Inventors: Shih-Hung Liao, Hsichih (TW); Chen-An Wu, Hsichih (TW); Yu-Chien Chueh, Hsichih (TW); Wu-Hsiung Chen, Hsichih (TW)

(73) Assignee: Chant Sincere Co., Ltd, Hsichih, Taipei Hsien (TW)

( * ) Notice: Subject to any disclaimer, the term of this patent is extended or adjusted under 35 U.S.C. 154(b) by 394 days.

(21) Appl. No.: 12/345,682

(22) Filed: Dec. 30, 2008

(65) Prior Publication Data

US 2009/0255991 A1 Oct. 15, 2009

(30) Foreign Application Priority Data

Apr. 11, 2008 (TW) ................ 97113383 A (51) Int. Cl.
*G06K 7/01* (2006.01)
(52) U.S. Cl. .................. 235/439; 235/441; 235/446
(58) Field of Classification Search ............. 439/630; 235/439, 441, 446
See application file for complete search history.

(56) References Cited

U.S. PATENT DOCUMENTS

| 7,178,736 | B2 * | 2/2007 | Yu et al. | 235/486 |
| 7,354,312 | B2 * | 4/2008 | Chuang | 439/630 |
| 7,364,439 | B2 * | 4/2008 | Lin | 439/76.1 |
| 7,575,481 | B1 * | 8/2009 | Liu | 439/660 |
| 7,632,151 | B2 * | 12/2009 | Wang et al. | 439/630 |

* cited by examiner

*Primary Examiner* — Steve S Paik
*Assistant Examiner* — Christle Marshall
(74) *Attorney, Agent, or Firm* — Bacon & Thomas, PLLC (57) ABSTRACT

A card reader includes a hollow base provided with a USB standard metal casing at one side, and an electric module mounted in the USB standard metal casing and the hollow base and defining with the USB standard metal casing an electronic card receiving space for accommodating an electric card such that the accommodated electronic card is insertable with the USB standard metal casing into a USB port of an electronic apparatus for two-way data transfer (reading or storing) between the electronic card and the electronic apparatus.

5 Claims, 10 Drawing Sheets

CARD READER

This application claims the priority benefit of Taiwan patent application number 097113383 filed on Apr. 11, 2008.

BACKGROUND OF THE INVENTION

1. Field of the Invention

The present invention relates to card readers and more particularly, to a card reader that has a USB standard metal casing and an electronic module mounted in the USB standard metal casing and defining an electronic card receiving space for receiving an electronic card for enabling the accommodated electronic card to be inserted with the USB standard metal casing into a USB port of an electronic apparatus for two-way data transfer.

2. Description of the Related Art

Following the development of high technology, various digitalized electric and electronic products are created. These high-tech electronic products, such as digital camera, digital video camera, cellular telephone, MP3 player, MP4 player, digital recorder and etc. commonly provide multiple functions and use an electronic (memory) card for storing static/dynamic audio and/or video data. Many electronic (memory) cards are commercially available, including MMC (MultiMediaCard), SD (Secure Digital), SM (SmartMedia), CF (Compact Flash), MS (Memory Stick), and their related mini and micro electronic (memory) cards. For reading storage data from an electronic card or storing data in it, a card reader is necessary. Many types of card readers are known. These conventional card readers commonly have an insertion slot defined in a housing for the insertion of an electronic card, and a transmission cable with an electric connector for connection to an electronic apparatus for enabling the electronic apparatus to read data from the inserted electronic card or to write data in it. These conventional card readers commonly have a big size, not convenient to carry with oneself. Further, certain card readers must be used with a driver.

Figure 10:
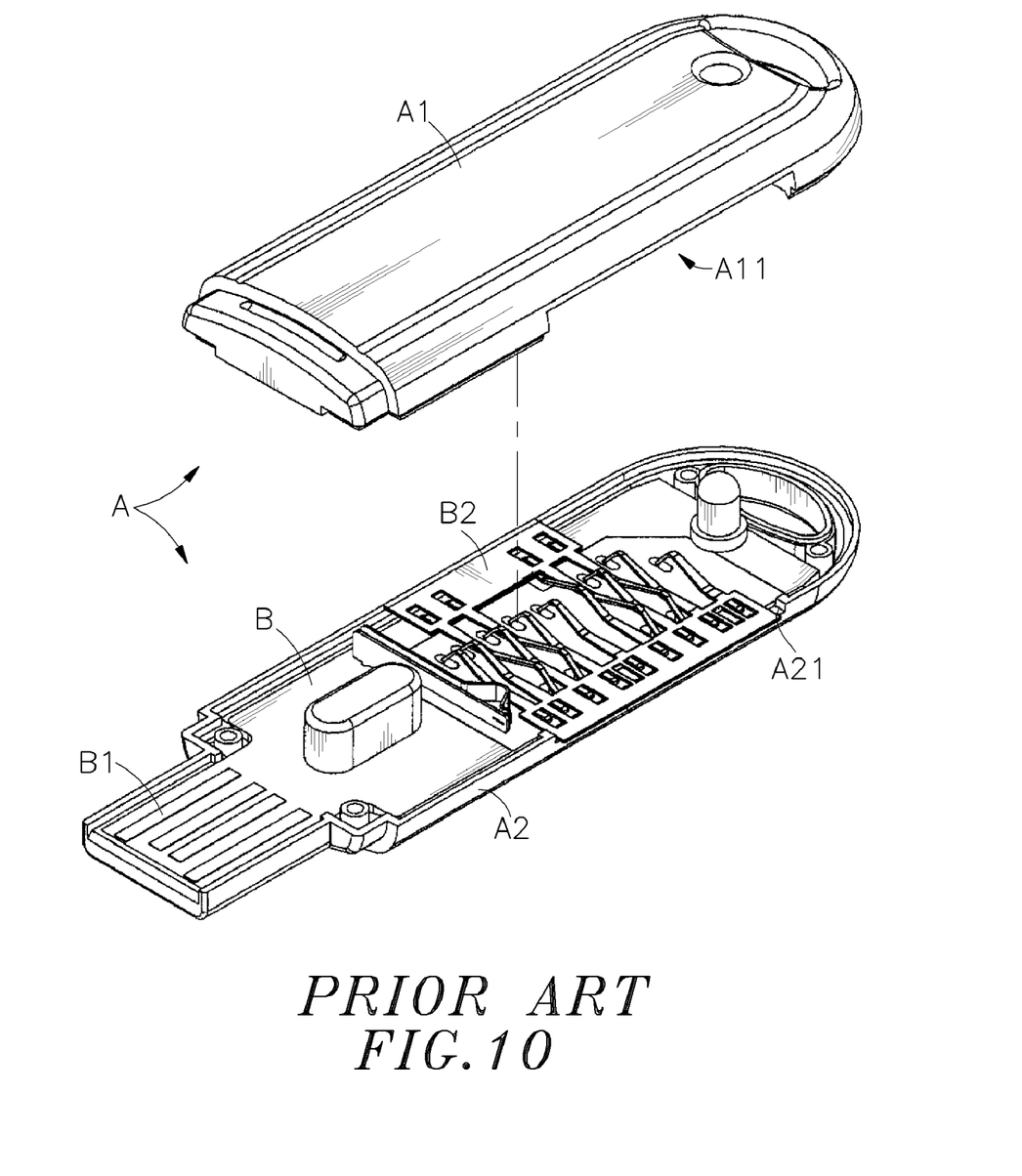
FIG. 10 is an exploded view of a card reader according to the prior art.

As shown in FIG. 10, a card reader A comprises a top cover shell A1 having a side opening A11, a bottom cover shell A2 having a side opening A21 matching the side opening A11 of the top cover shell A1, and a circuit board B mounted in between the top cover shell A1 and the bottom cover shell A2. The circuit board B comprises a USB terminal unit B1 and a memory card terminal unit B2. When in use, an electronic card is inserted into the side opening A11 of the top cover shell A1 and the side opening A21 of the bottom cover shell A2 and electrically connected to the memory card terminal unit B2, and then the card reader is inserted into a USB port of an electronic apparatus to have the USB terminal unit B1 be electrically connected to the electronic apparatus for two-way data transfer between the inserted electronic card and the electronic apparatus. This design of card reader still has drawbacks as follows:

(1) Because the circuit board B has its USB terminal unit B1 and memory card terminal unit B2 arranged at two far apart sides, the length of the card reader A cannot be minimized.

(2) Because the side openings A11 of the top cover shell A1 and the side opening A21 of the bottom cover shell A2 are disposed at one lateral side of the card reader A for the insertion of an electronic card, the inserted electronic card has a part protruding over one lateral side of the card reader A, hindering the plugging and deplugging operation of the card reader A.

Therefore, it is desirable to provide a compact card reader that eliminates the aforesaid drawbacks.

SUMMARY OF THE INVENTION

The present invention has been accomplished under the circumstances in view. It is therefore one object of the present invention to provide a card reader, which is small-sized, convenient for carrying with oneself. It is another object of the present invention to provide a card reader, which has the inserted electronic card kept on the inside for direct insertion with the card reader into the inside of a USB port of an electronic apparatus. To achieve these and other objects of the present invention, the card reader comprises a hollow base, a USB standard metal casing connected to one side of the hollow base, and an electric module mounted in the USB standard metal casing and the hollow base and defining with the USB standard metal casing an electronic card receiving space for accommodating an electric card such that the accommodated electronic card is insertable with the USB standard metal casing into a USB port of an electronic apparatus for two-way data transfer (reading or storing) between the electronic card and the electronic apparatus.

DETAILED DESCRIPTION OF THE PREFERRED EMBODIMENT

Figure 1:
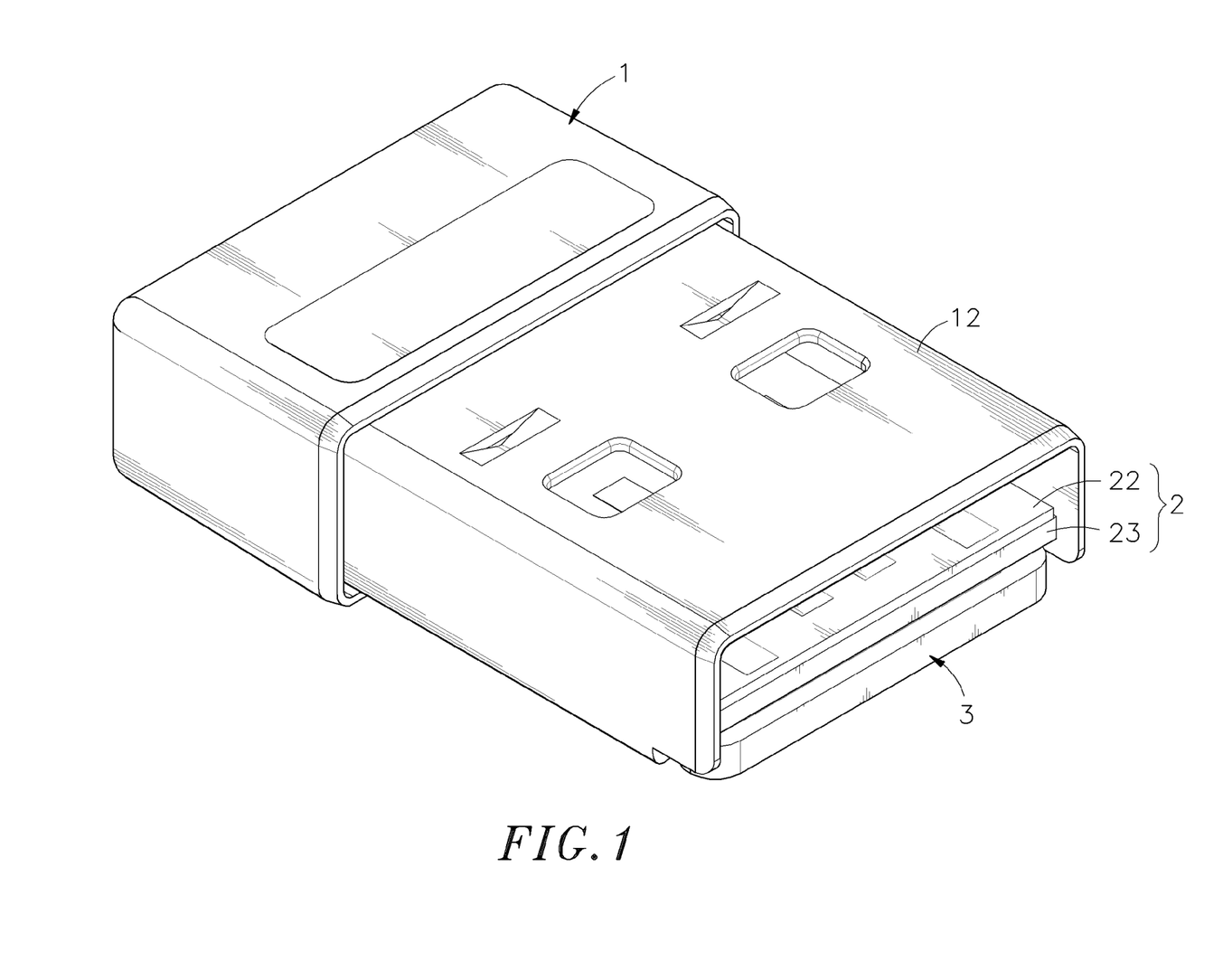
FIG. 1 is an elevational view of a card reader in accordance with a first embodiment of the present invention.
Figure 2:
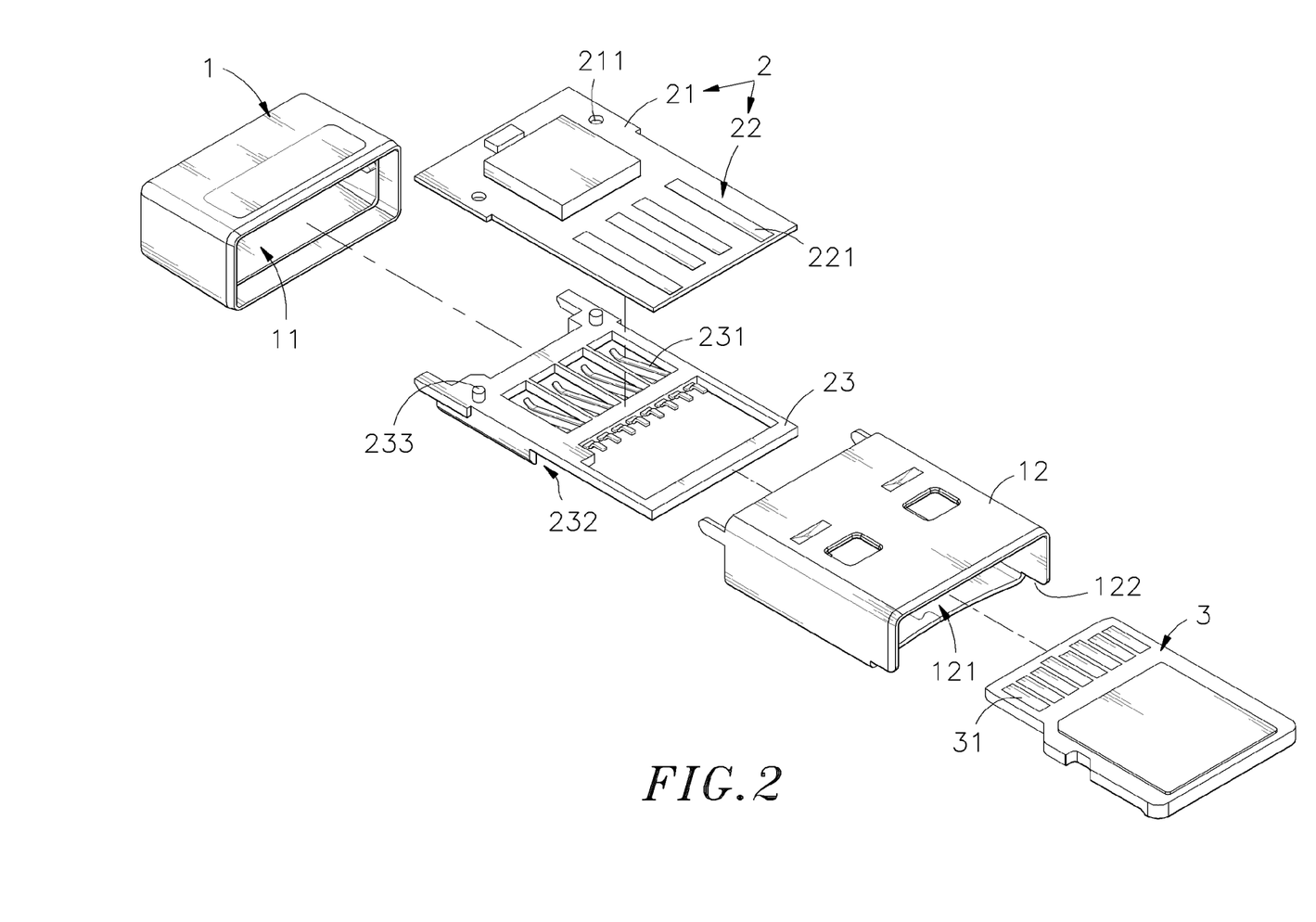
FIG. 2 is an exploded view of the card reader in accordance with the first embodiment of the present invention.
Figure 3:
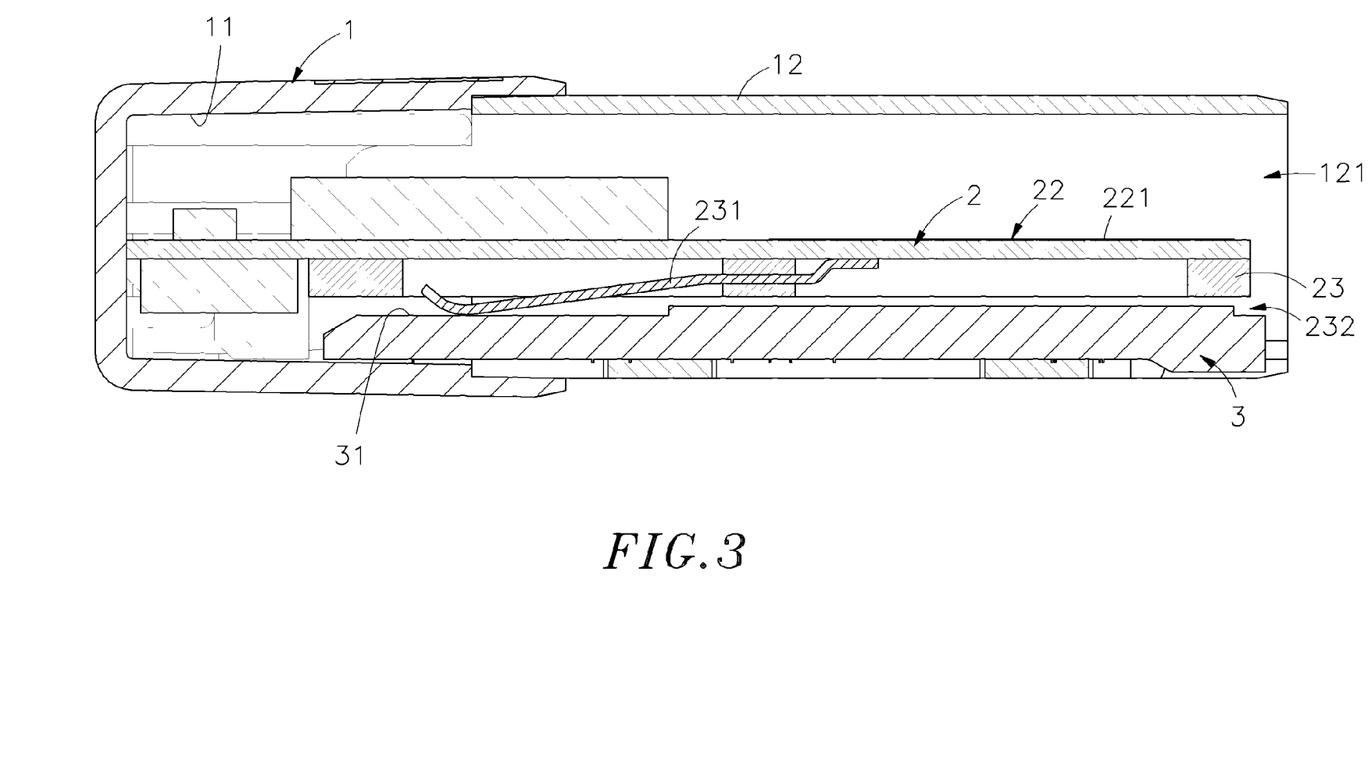
FIG. 3 is a sectional side view of the card reader in accordance with the first embodiment of the present invention.

Referring to FIGS. 1~3, a card reader in accordance with a first embodiment of the present invention is shown comprised of a hollow base 1 and an electric module 2.

The hollow base 1 defines therein an accommodation chamber 11, and has a USB standard metal casing 12 fixedly connected to an open side of the accommodation chamber 11. The USB standard metal casing 12 has an inside space 121 disposed in communication with the accommodation chamber 11, and a front bottom notch 122 on its front bottom side.

The electric module 2 comprises a circuit board 21 that carries a plurality of electronic components, an electric connection unit 22 formed of a plurality of metal contacts 221 on one side of the circuit board 21 subject to the USB standard, an electrically insulative terminal holder 23 attached to the other side of the circuit board 21 opposite to the electric connection unit 22, and a plurality of conducting terminals 231 installed in the electrically insulative terminal holder 23. Further, the electrically insulative terminal holder 23 defines an electronic card receiving space 232 on its bottom side opposite to the circuit board 2.

During installation, the electric module 2 is accommodated in the inside space 121 of the USB standard metal casing 12 and the accommodation chamber 11 of the hollow base 1, keeping the electric connection unit 22 in the inside space 121 of the USB standard metal casing 12 and the electronic card receiving space 232 in communication with the front bottom notch 122.

Further, the circuit board 21 has a plurality of mounting through holes 211. The electrically insulative terminal holder 23 has a plurality of mounting rods 233 respectively press-fitted into the mounting through holes 211 to secure the electrically insulative terminal holder 23 to the circuit board 21 firmly.

Figure 4:
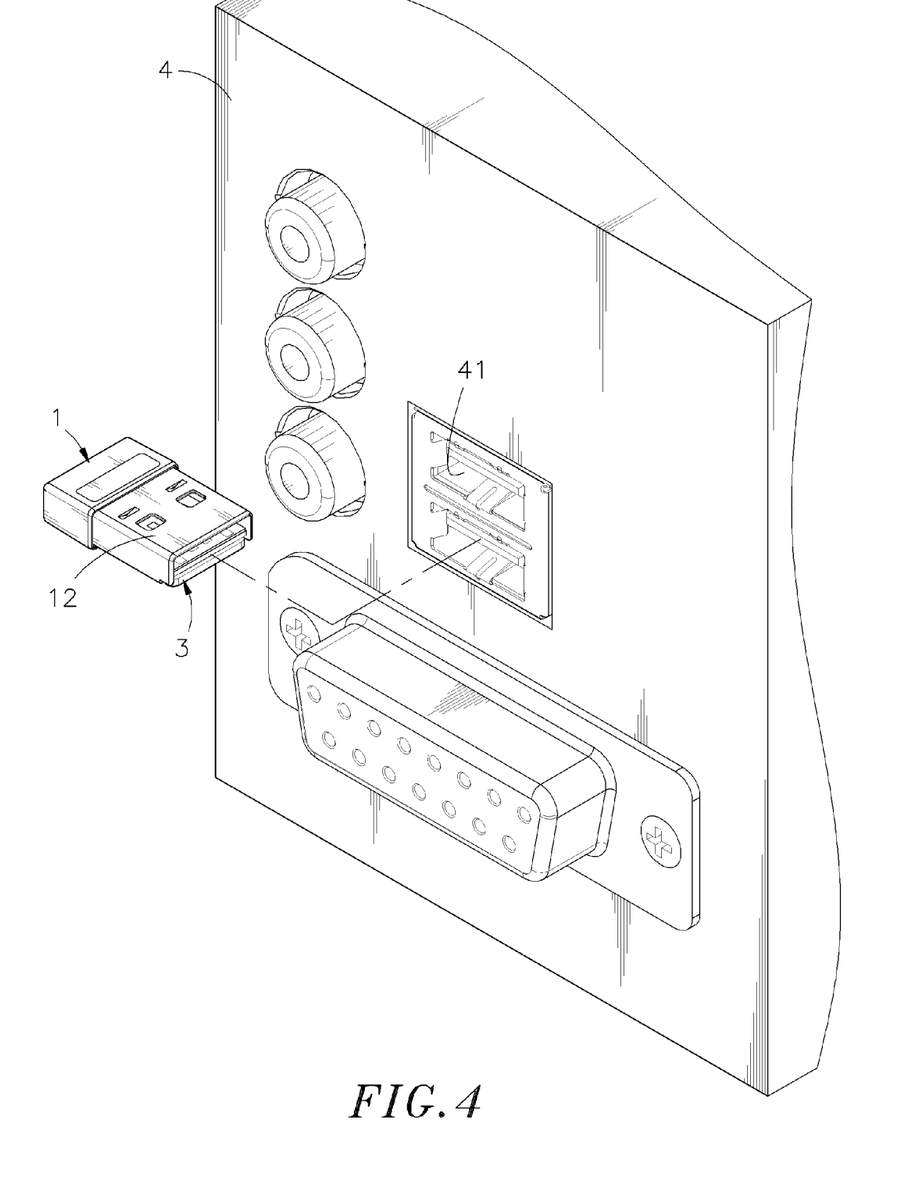
FIG. 4 is a schematic drawing, showing the relationship between the card reader of the first embodiment of the present invention and a USB port on an electronic apparatus.
Figure 5:
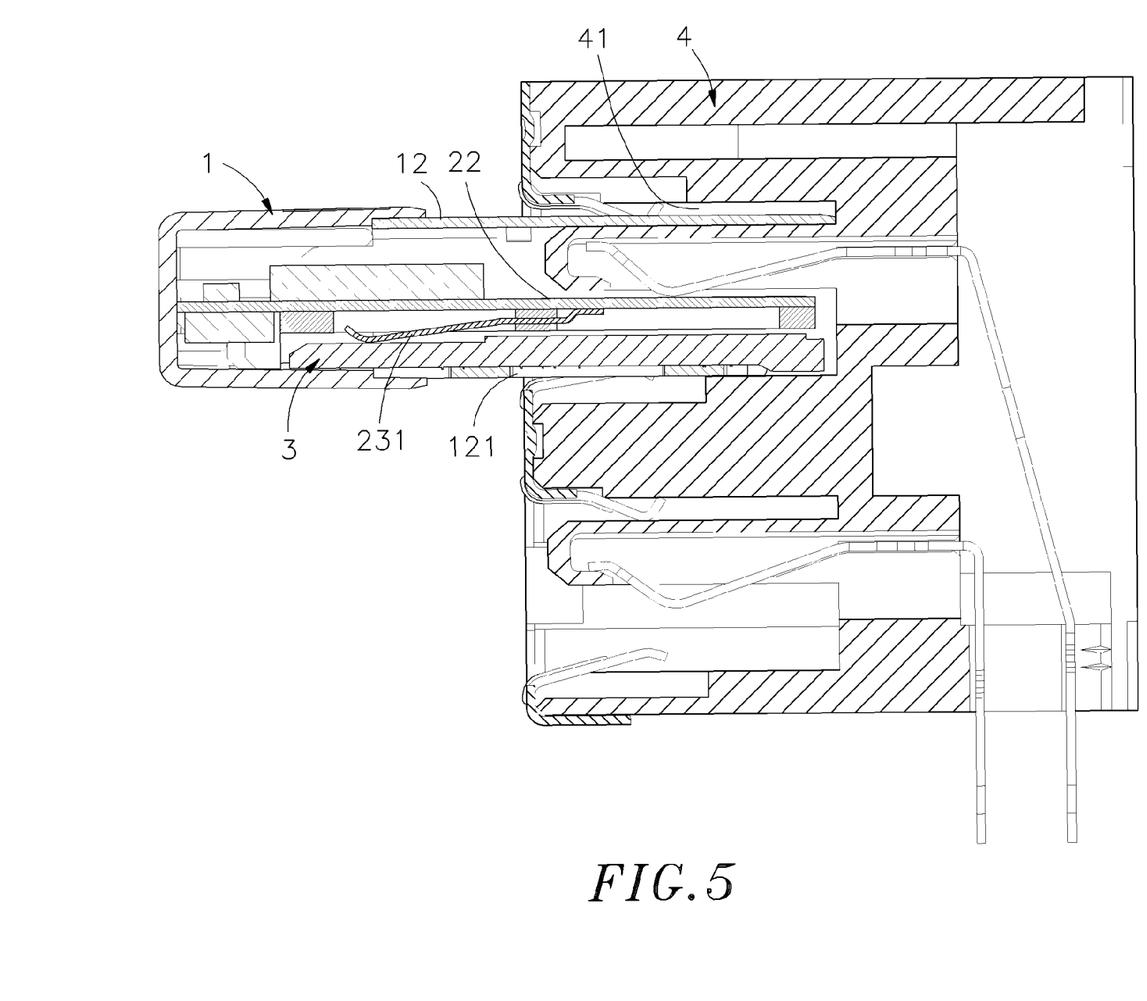
FIG. 5 is a sectional view, showing the card reader of the first embodiment of the present invention inserted into a USB port on an electronic apparatus.

Referring to FIGS. 4 and 5 and FIGS. 2 and 3 again, the accommodation chamber 11 of the hollow base 1 is disposed in communication with the electronic card receiving space 232 in the inside space 121 of the USB standard metal casing 12 for the insertion of an electronic card 3. When an electronic card 3 is inserted into the electronic card receiving space 232 in the inside space 121 of the USB standard metal casing 12, metal contacts 31 of the inserted electronic card 3 are forced into contact with the conducting terminals 231 in the electrically insulative terminal holder 23 respectively. At this time, a user can insert the USB standard metal casing 12 of the card reader into a USB port 41 on an electronic apparatus 4 (such as desk computer, notebook computer, PDA or multipurpose office machine) for two-way data transfer (reading or storing) between the electronic card 3 (for example, Micro SD card) and the electronic apparatus 4.

Further, the hollow base 1 is molded from plastics on the USB standard metal casing 12 by means of an insert molding technique, and then assembled with the electric module 2 to form a card reader having the configuration of a USB connector (USB plug or USB socket). By means of the inside space 121 of the USB standard metal casing 12 and the accommodation chamber 11 of the hollow base 1 to accommodate the electric module 2, an electronic card 3 can be inserted into the electronic card receiving space 232 to have its metal contacts 31 of the inserted electronic card 3 be forced into contact with the conducting terminals 231 in the electrically insulative terminal holder 23. Further, through the front bottom notch 122 of the USB standard metal casing 12, the user can pull the inserted electronic card 3 out of the card reader conveniently. After insertion of an electronic card 3 into the electronic card receiving space 232, it is kept inside the USB standard metal casing 12. As stated above, the card reader is made subject to the configuration of a USB connector (USB plug or USB socket), having light, thin, short and small characteristics, and therefore the card reader is convenient for carrying and use.

Figure 6:
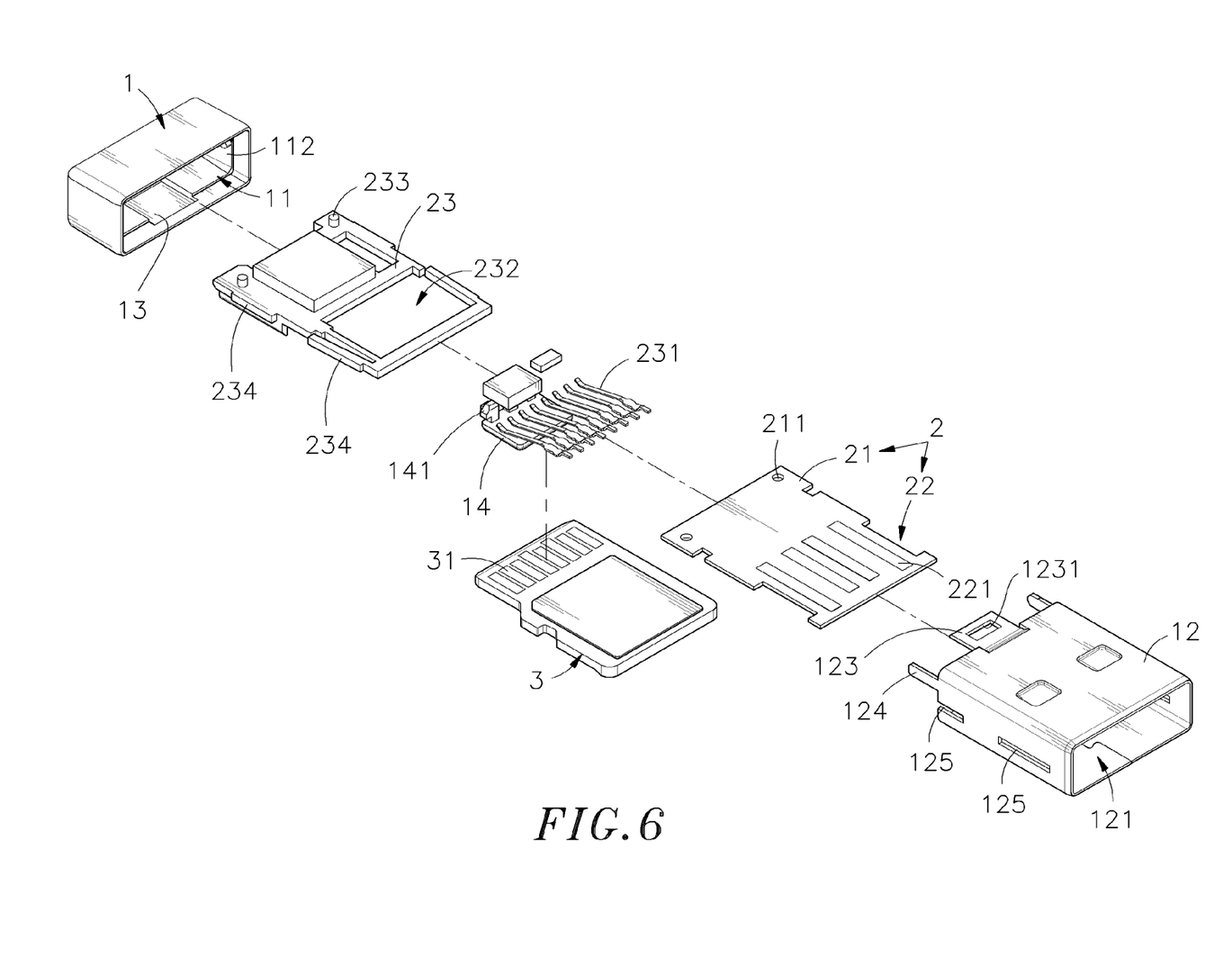
FIG. 6 is an exploded view of a card reader in accordance with a second embodiment of the present invention.
Figure 7:
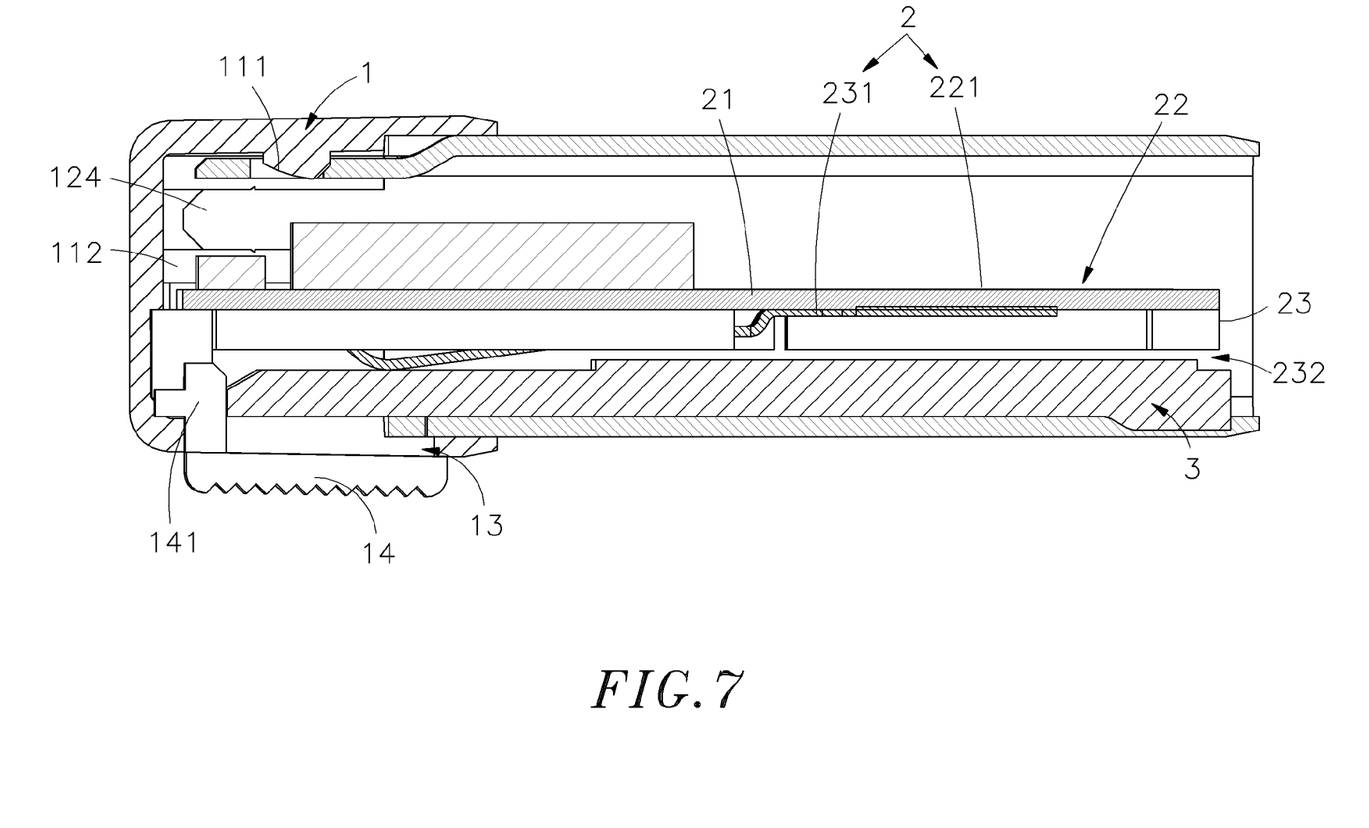
FIG. 7 is a sectional assembly view of the card reader in accordance with the second embodiment of the present invention.

FIGS. 6 and 7 show a card reader in accordance with a second embodiment of the present invention. This second embodiment is substantially similar to the aforesaid first embodiment with the exception that the hollow base 1 and the USB standard metal casing 12 according to this second embodiment are separately made and then assembled together. The hollow base 1 according to this second embodiment has a hook block 111 protruded from the inner surface of its top wall and suspending in the accommodation chamber 11 at the top, two locating grooves 112 symmetrically disposed at two opposite lateral sides in the accommodation chamber 11, and a bottom opening 13 cut through its bottom wall. The USB standard metal casing 12 according to this second embodiment has a mounting lug 123 and two locating rods 124 respectively extended from its top wall and two opposite lateral walls. The mounting lug 123 defines a retaining hole 1231. During installation of this second embodiment, the USB standard metal casing 12 is inserted into the accommodation chamber 11 of the hollow base 1 to force the two locating rods 124 into the two locating grooves 112 respectively, and at the same time the retaining hole 1231 of the mounting lug 123 is forced into engagement with the hook block 111. This second embodiment further comprises a sliding card ejector 14 slidably coupled to the bottom opening 13 of the hollow base 1. The sliding card ejector 14 has a push member 141 vertically suspending in the accommodation chamber 11 for stopping against the front edge of the inserted electronic card 3. When moving the sliding card ejector 14 relative to the hollow base 1, the push member 141 is forced to push the inserted electronic card 3 out of the inside space 121 of the USB standard metal casing 12 and the electronic card receiving space 232 of the electrically insulative terminal holder 23.

Further, the USB standard metal casing 12 according to this second embodiment has a plurality of retaining holes 125 disposed at its two opposite lateral sides, and the electrically insulative terminal holder 23 according to this second embodiment has a plurality of elastic retaining members 234 disposed at its two opposite lateral sides and respectively forced into engagement with the retaining holes 125 of the USB standard metal casing 12.

Figure 8:
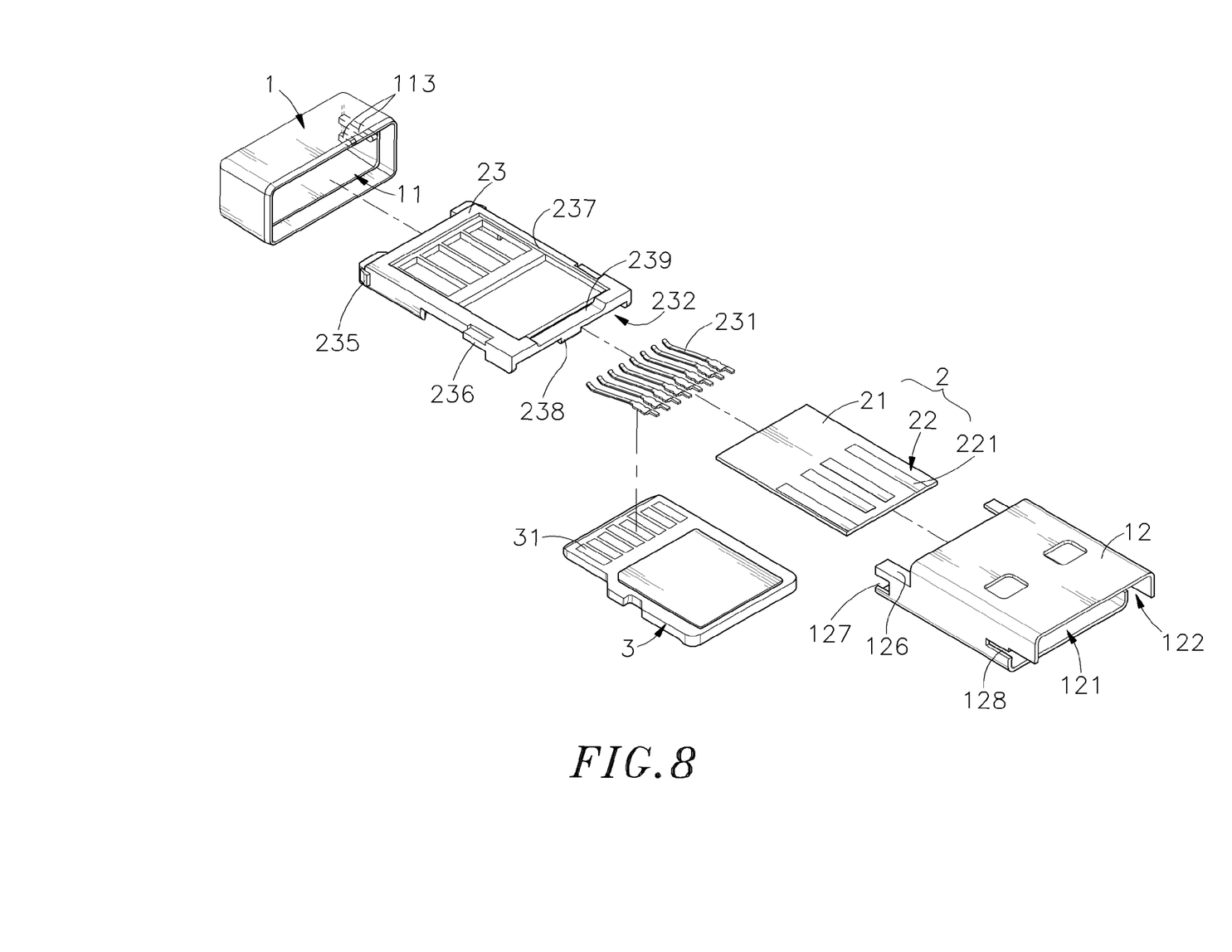
FIG. 8 is an exploded view of a card reader in accordance with a third embodiment of the present invention.
Figure 9:
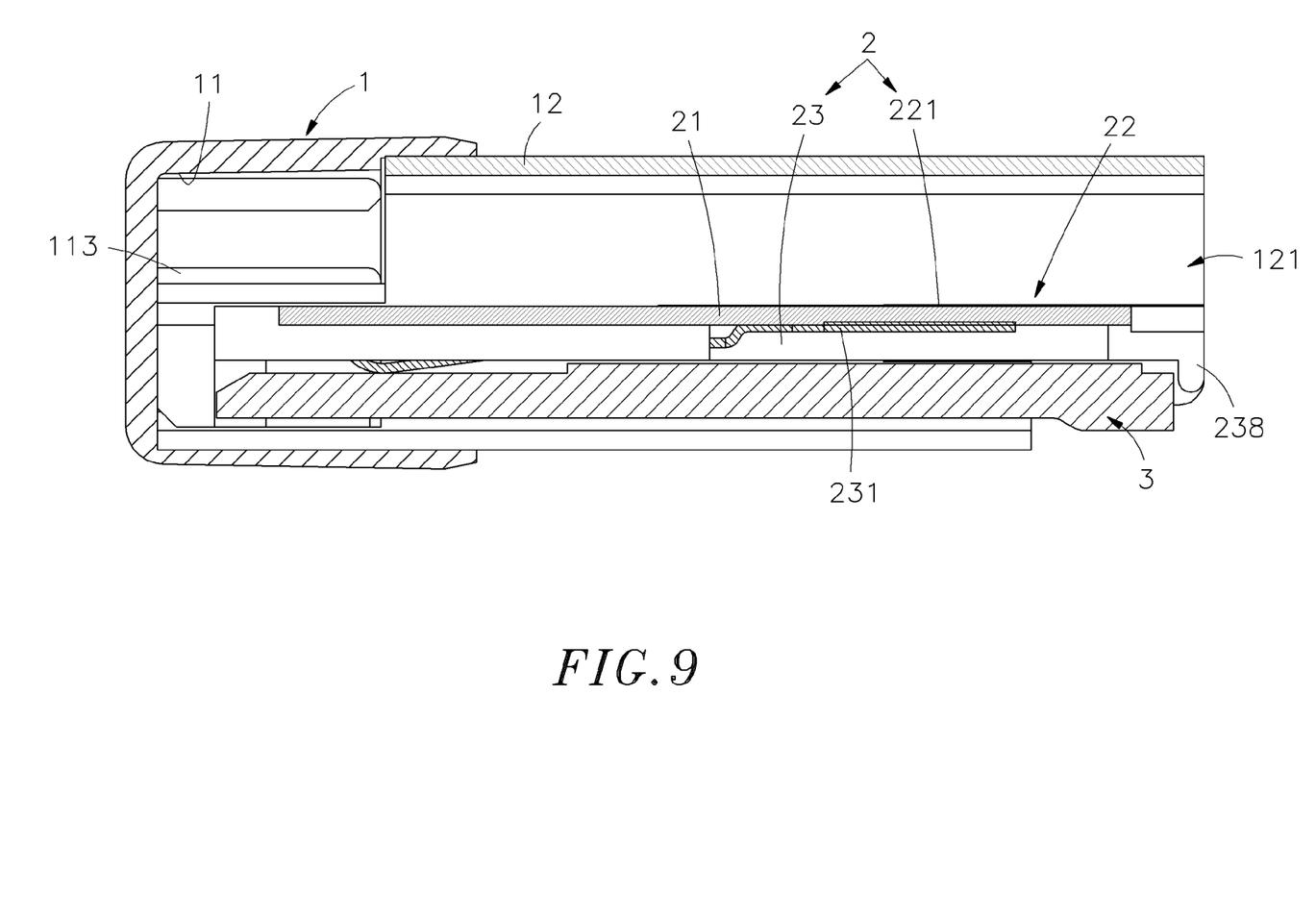
FIG. 9 is a sectional assembly view of the card reader in accordance with the third embodiment of the present invention.

FIGS. 8 and 9 show a card reader in accordance with a third embodiment of the present invention. According to this third embodiment, the hollow base 1 comprises engagement portions 113 bilaterally symmetrically disposed inside the accommodation chamber 11; the USB standard metal casing 12 comprises two engagement portions 126 respectively extended from its two opposite lateral walls and respectively forced into engagement with the engagement portions 113 of the hollow base 1, two rear locating notches 127 bilaterally disposed at its front side beneath the engagement portions 126, and two front locating notches 128 bilaterally disposed at its rear side; the electrically insulative terminal holder 23 comprises two rear retaining blocks 235 bilaterally disposed at the rear side and respectively engaged in the rear locating notches 127 of the USB standard metal casing 12, two front retaining blocks 236 bilaterally disposed at the front side and respectively engaged in the front locating notches 128 of the USB standard metal casing 12, a top locating groove 237, which receives the circuit board 2, a springy front stop flange 238 for stopping at the front edge of the electronic card 3 that is inserted into the electronic card receiving space 232 of the electrically insulative terminal holder 23 to hold the inserted electronic card 3 in position, and a recessed finger rest 239 formed on the top side of the springy front stop flange 238 for enabling the user to pull the springy front stop flange 238 upwards and to disengage the springy front stop flange 238 from the electronic card 3.

As stated above, the hollow base 1 and the USB standard metal casing 12 are fixedly connected together and then assembled with the electric module 2 to form a card reader having the configuration of a USB connector (USB plug or USB socket). By means of the inside space 121 of the USB standard metal casing 12 and the accommodation chamber 11 of the hollow base 1 to accommodate the electric module 2, an electronic card 3 can be inserted into the electronic card receiving space 232 to have its metal contacts 31 of the inserted electronic card 3 be forced into contact with the conducting terminals 231. When in use, the USB standard metal casing 12 of the card reader is inserted into a USB port 41 of an electronic apparatus 4 for two-way data transfer (reading or storing) between the electronic card 3 and the electronic apparatus 4.

In conclusion, the invention provides a card reader, which has the following features and advantages:

1. The hollow base 1 of the card reader has a USB standard metal casing 12 connected thereto to accommodate an electric module 2 and an electronic card 3, and therefore the card reader has light, thin, short and small characteristics.

2. The card reader allows an electronic card 3 be directly inserted into the inside space 121 of the USB standard metal casing 12, facilitating the application.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A card reader, comprising:
    a hollow base, said hollow base defining therein an accommodation chamber;
    a USB standard metal casing fixedly connected to said hollow base, said USB standard metal casing defining therein an inside space in communication with said accommodation chamber;
    an electric module mounted in said inside space of said USB standard metal casing and said accommodation chamber of said hollow base, said electric module comprising an electric connection unit for the connection of a matching USB interface, an electronic card receiving space defined at a bottom side relative to said electric connection unit within said USB standard metal casing for receiving an electronic card, and a set of conducting terminals suspending in said electronic card receiving space for the contact of metal contacts of an electronic card.

2. The card reader as claimed in claim 1, wherein said USB standard metal casing is configured for insertion into a USB socket, comprising a front bottom notch in front of said electronic card receiving space.

3. The card reader as claimed in claim 1, wherein said hollow base is molded from plastics on said USB standard metal casing by means of an insert molding technique.

4. The card reader as claimed in claim 1, wherein said electronic module further comprises a circuit board; said electric connection unit of said electric module comprises a plurality of metal contacts configured subject to the USB standard and is electrically connected to one side of said circuit board.

5. The card reader as claimed in claim 1, wherein said electric module comprises an electrically insulative terminal holder suspending in said inside space of said USB standard metal casing to hold said conducting terminals; said electronic card receiving space is defined in a bottom side of said electrically insulative terminal holder within said inside space of said USB standard metal casing.

* * * * *